United States Patent
Naef et al.

(10) Patent No.: US 7,794,767 B2
(45) Date of Patent: Sep. 14, 2010

(54) FLAVORING INGREDIENTS

(75) Inventors: Regula Naef, Seewen (CH); Alain Jaquier, Commugny (CH)

(73) Assignee: Firmenich SA, Geneva (CH)

( * ) Notice: Subject to any disclaimer, the term of this patent is extended or adjusted under 35 U.S.C. 154(b) by 234 days.

(21) Appl. No.: 11/778,402

(22) Filed: Jul. 16, 2007

(65) Prior Publication Data

US 2007/0259088 A1    Nov. 8, 2007

Related U.S. Application Data

(63) Continuation of application No. PCT/IB2006/050543, filed on Feb. 20, 2006.

(30) Foreign Application Priority Data

Mar. 4, 2005    (WO) ................ PCT/IB2005/000613

(51) Int. Cl.
A23L 1/22    (2006.01)
A23L 2/56    (2006.01)
(52) U.S. Cl. ........................ 426/534; 512/25
(58) Field of Classification Search ............... 426/534
See application file for complete search history.

(56) References Cited

U.S. PATENT DOCUMENTS 3,754,936 A * 8/1973 Epstein ..................... 426/534
3,767,425 A * 10/1973 Parliment et al. ........... 426/537
2003/0092599 A1    5/2003 Suganuma et al. ............ 512/1

FOREIGN PATENT DOCUMENTS

JP    2003 508753    2/2003

OTHER PUBLICATIONS

I. A. Sigrist et al., XP-002389289, "Aroma Compounds Formed From 3-Methyl-2, 4-nonanedione Under Photooxidative Conditions", Journal of Agricultural and Food Chemistry, vol. 51, pp. 3426-3428 (2003).

* cited by examiner

*Primary Examiner*—Keith D Hendricks
*Assistant Examiner*—Elizabeth Gwartney
(74) *Attorney, Agent, or Firm*—Winston & Strawn LLP

(57) ABSTRACT

The present invention relates to a compound of formula

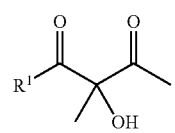

(I)

wherein $R^1$ is a $C_{2-7}$ linear alkyl group. This compound can be used as flavoring ingredient, for instance to impart flavor notes of the green tea and creamy/fatty type as well as to impart a desirable mouthfeel effect.

12 Claims, No Drawings

FLAVORING INGREDIENTS

CROSS-REFERENCE TO RELATED APPLICATIONS

This application is a continuation of International application PCT/IB2006/050543 filed on Feb. 20, 2006, the entire content of which is expressly incorporated herein by reference thereto.

TECHNICAL FIELD

The present invention relates to the field of flavor. More particularly, it concerns the use as flavoring ingredient of a 3-hydroxy-3-methyl-2,4-alkanedione, in particular to impart mouthfeel sensations, as well as green tea and creamy/fatty flavor notes.

PRIOR ART

Amongst the inventive compounds only 3-hydroxy-3-methyl-2,4-nonanedione has been reported in the prior art (see I. A. Sigrist et al in J. Agric. Food. Chem., 2003, 51, 3426). In this article it is described a compound, which is identified as being 3-hydroxy-3-methyl-2,4-nonanedione, obtained by a photo-degradation product of 3-methyl-2,4-nonanedione. The compound is described in the form of a composition which is not a flavoring composition as it comprises ingredients which render the composition improper for a use in the food and flavor industry, for example hexane or meso-tetraphenyl porphyrine.

The cited prior art describes 3-hydroxy-3-methyl-2,4-nonanedione as being an odorant compound with an odor description of rubbery, earthy and plastic-like. In other words, for a person skilled in the art of flavors, this compound is described as providing only undesirable odor off-notes, raising thus a prejudice to its use as flavor ingredient, especially to impart mouthfeel and/or flavor notes of the green tea and creamy/fatty type.

SUMMARY OF THE INVENTION

The present invention now relates to the use as flavoring ingredient of a 3-hydroxy-3-methyl-2,4-alkanedione, as well as the compositions or articles containing the compound.

DETAILED DESCRIPTION OF THE PREFERRED EMBODIMENTS

It has been surprisingly discovered that a compound of formula

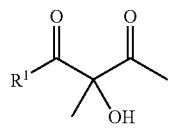

(I)

wherein $R^1$ is a $C_{2-7}$ linear alkyl group;
can be used as flavoring ingredient.

Therefore, the present invention concerns a method to confer, enhance, improve or modify the flavor properties or the mouthfeel of a flavoring composition or of a flavored article, which method comprises adding to the composition or article at least one compound of formula

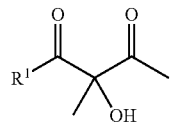

(I)

wherein $R^1$ is a $C_{2-7}$ linear alkyl group;
in a flavor effective amount. In particular, the compound (I) can be used in order to confer, enhance, improve or modify the mouthfeel and/or the green-tea, creamy/fatty notes of a flavoring composition or of a flavored article.

According to a particular embodiment of the invention, the compound (I) is added to the flavoring composition or of a flavored article in an amount comprised between 5% and 0.0001%, relative to the total weight of the flavoring composition or flavored article.

The compounds of formula (I) are chiral, i.e., can be in the form of R or S isomers. According to any of the above-mentioned embodiments, the inventive compounds can be in the form of a pure isomer of configuration R or S or a mixture thereof.

According to a particular embodiment of the invention, $R^1$ represents $C_4$-$C_7$ linear alkyl group, and in particular a n-pentyl group.

Amongst the compounds of formula (I), one may cite in particular, and as non-limiting example, 3-hydroxy-3-methyl-2,4-nonanedione. This compound is very appreciated for its ability to impart or improve the mouthfeel of the preparation in which it is added. This effect goes in general with the improving or the imparting of a creamy/fatty flavor note of the compositions or articles into which the compound is added. Furthermore, depending on the type of preparation in which the inventive compound is added, it is also able to impart an organoleptic impression similar the one of fresh brewed green tea.

The use of 3-hydroxy-3-methyl-2,4-nonanedione has proved to be of great help for the formulation of well balanced and performing green tea, mint, dairy or savory flavors.

Another example of an inventive compound is 3-hydroxy-3-methyl-2,4-octanedione which possesses organoleptic properties very similar to the one of the higher analogue mentioned hereinabove, but distinguishes itself by having a bit weaker green tea note.

Amongst the compounds of formula (I), 3-hydroxy-3-methyl-2,4-nonanedione is the preferred one.

As mentioned above, amongst the compounds of formula (I) only 3-hydroxy-3-methyl-2,4-nonanedione is known, therefore the compounds wherein $R^1$ is a $C_{2-4}$ or $C_{6-7}$ linear alkyl group are also an object of the present invention.

As mentioned above, the invention concerns the use of a compound of formula (I) as flavoring ingredients, in particular, the use as mouthfeel agent or the use to impart green tea and/or creamy/fatty flavor notes. By "use of a compound of formula (I)" it has to be understood here also the use of any compounded composition containing compound (I) and which can be advantageously employed in flavors industry as flavoring ingredient. The expression "compounded flavoring composition" has the general meaning in the art that is to say a composition obtained by admixing together various ingredients of different origin (natural or synthetic).

The compounded flavoring compositions mentioned above are also another object of the present invention. The compounded flavoring composition comprises:

i) as flavoring ingredient, at least one compound of formula

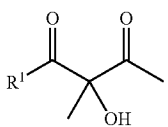
(I)

wherein $R^1$ is a $C_{2-7}$ linear alkyl group;
ii) at least one ingredient selected from the group consisting of a flavor carrier and a flavor base; and
iii) optionally at least one flavor adjuvant.

It has to be pointed out that the term "flavoring composition" has the usual meaning in the art, that is to say that it is a composition which imparts a hedonic effect, i.e. is able to impart or modify in a pleasant way the taste of a preparation, and not just as imparting a taste.

The proportions in which the compounds according to the invention can be incorporated into the various compositions vary within a wide range of values. These values are dependent on the nature of the article to be flavored and on the desired organoleptic effect as well as the nature of the co-ingredients in a given base when the compounds according to the invention are mixed with flavoring co-ingredients, solvents or additives commonly used in the art. Typical examples of the proportions are given above.

By "flavor carrier" we mean here a material which is practically neutral from a flavor point of view, i.e. that does not significantly alter the organoleptic properties of flavoring ingredients. The carrier may be a liquid or a solid.

As liquid carrier one may cite, as non-limiting examples, an emulsifying system, i.e. a solvent and a surfactant system, or a solvent commonly used in flavors. A detailed description of the nature and type of solvents commonly used in flavor cannot be exhaustive. However, one can cite as non-limiting example solvents such as propylene glycol, triacetine, triethyl citrate, benzylic alcohol, ethanol, vegetable oils or terpenes.

As solid carrier one may cite, as non-limiting examples, absorbing gums or polymers, or yet encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloids: Stabilisatoren, Dickungs- und Geliermittel in Lebensmittel, Band 2 der Schriftenreihe Lebensmittelchemie, Lebensmittelqualität, Behr's VerlagGmbH & Co., Hamburg, 1996. The encapsulation is a well known process to a person skilled in the art, and may be performed, for instance, using techniques such as spray-drying, agglomeration or yet extrusion; or consists of a coating encapsulation, including coacervation and complex coacervation techniques.

Generally speaking, by "flavor base" we mean here a composition comprising at least one flavoring co-ingredient.

The flavoring co-ingredient is not of the formula (I). Moreover, by "flavoring co-ingredient" it is meant here a compound, which is used in flavoring preparation or composition to impart a hedonic effect. In other words such a co-ingredient, to be considered as being a flavoring one, must be recognized by a person skilled in the art as being able to impart or modify in a positive or pleasant way the odor or taste of a composition, and not just as having a taste.

The nature and type of the flavoring co-ingredients present in the base do not warrant a more detailed description here, which in any case would not be exhaustive, the skilled person being able to select them on the basis of its general knowledge and according to intended use or application and the desired organoleptic effect. In general terms, these flavoring co-ingredients belong to chemical classes as varied as alcohols, aldehydes, ketones, esters, ethers, acetates, nitriles, terpene hydrocarbons, nitrogenous or sulphurous heterocyclic compounds and essential oils, and the perfuming co-ingredients can be of natural or synthetic origin. Many of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of flavor. It is also understood that the co-ingredients may also be compounds known to release in a controlled manner various types of flavoring compounds.

Generally speaking, by "flavor adjuvant" we mean here an ingredient capable of imparting additional added benefit such as a color, a particular light resistance, chemical stability, etc. A detailed description of the nature and type of adjuvant commonly used in flavoring bases cannot be exhaustive, but it has to be mentioned that the ingredients are well known to a person skilled in the art.

An inventive composition consisting of at least one compound of formula (I) and at least one flavor carrier represents a particular embodiment of the invention as well as a flavoring composition comprising at least one compound of formula (I), at least one flavor carrier, at least one flavor base, and optionally at least one flavor adjuvant.

The inventive compositions containing the 3-hydroxy-3-methyl-2,4-nonanedione are preferred.

It is useful to mention here that the possibility to have, in the compositions mentioned above, more than one compound of formula (I) is important as it enables the flavorist to prepare accords, flavors, possessing the flavor tonality of various compounds of the invention, creating thus new tools for their work.

Any composition resulting directly from a chemical synthesis, e.g. without an adequate purification, in which the compound of the invention would be involved as a starting, intermediate or end-product could not be considered as a flavoring composition according to the invention.

Furthermore, one or more of the inventive compounds can also be advantageously incorporated into flavored articles to positively impart, or modify, the taste of the articles. Consequently, a flavored article comprising:
i) as flavoring ingredient, at least one compound of formula

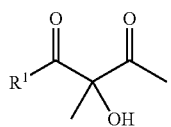
(I)

wherein $R^1$ is a $C_{2-7}$ linear alkyl group; and
ii) a foodstuff base;

is also an object of the present invention.

In the flavored article, the inventive compound(s) can be present in an amount comprised between 5% and 0.0001%, relative to the total weight of the flavored article, or in an amount as specified further above.

For sake of clarity, it has to be mentioned that, by "foodstuff base" we mean here an edible product, e.g. a food or a beverage. Therefore, a flavored article according to the invention comprises the functional formulation, as well as optionally additional benefit agents, corresponding to a desired edible product, e.g., teas or yoghurt, and a flavor effective amount of at least one inventive compound.

The nature and type of the constituents of the foodstuffs or beverages do not warrant a more detailed description here, which in any case would not be exhaustive, the skilled person being able to select them on the basis of its general knowledge and according to the nature of the product.

Suitable foodstuffs, e.g., foods or beverages, include dairy preparations such as yoghurt, ice cream, flavored milk, low fat preparations (e.g. having less that 70% of the amount of fat compared to the normal product), milk based drinks, cream based desserts and hot or cold beverages, tea drinks.

Suitable foodstuffs include also savory products, such as soups, stock cubes, snacks, canned food, oils and fats, frozen meals, sauces, in particulars those having a meat character. In this embodiment the inventive compound, in particular 3-hydroxy-3-methyl-2,4-nonanedione, has also been surprisingly found to be able to modify or improve the salt perception of the preparations in which it is added.

The proportions in which the compounds according to the invention can be incorporated into the various aforementioned articles or compositions vary within a wide range of values. These values are dependent on the nature of the article to be flavored and on the desired organoleptic effect as well as the nature of the co-ingredients in a given base when the compounds according to the invention are mixed with flavoring co-ingredients, solvents or additives commonly used in the art. Typical examples of the proportions or amounts are given above.

However, one may cite as non-limiting examples, also concentrations in the order of 0.001% to 0.3% by weight, when these compounds are incorporated into flavored articles, percentage being relative to the weight of the article. More specifically, one may cite tea drinks comprising the inventive compounds in a concentration comprised between 0.001% and 0.1% by weight of the drink, mint flavored article comprising the inventive compound in a concentration comprised between 0.05% and 0.3% by weight of the article, dairy articles comprising the inventive compound in a concentration comprised between 0.01% and 0.05% by weight of the articles, or also savory articles comprising the inventive compound in a concentration comprised between 0.01% and 0.1% by weight of the articles.

The inventive articles or compositions containing the 3-hydroxy-3-methyl-2,4-nonanedione are preferred.

The inventive compounds (I) are obtainable by a process comprising the following steps:
a) reacting 2,3-butanedione with a tri($C_{1-3}$ alkyl) phosphite, preferably P(OMe)$_3$, in order to obtain a 2,2,2-tri($C_{1-3}$ alkoxy)-4,5-dimethyl-1,3,2-dioxaphosphole, preferably 2,2,2-tri(methoxy)-4,5-dimethyl-1,3,2-dioxaphosphole;
b) reacting the product obtained in step a) with a compound R$^1$COCl, R$^1$ having the same meaning as described above, in order to obtain a 1-acetyl-1-methyl-2-oxoalkyl dimethyl phosphate, wherein alkyl means a group having the meaning of R$^1$, preferably 1-acetyl-1-methyl-2-oxoheptyl dimethyl phosphate; and
c) reacting the compound obtained in step b) with water at a temperature below 130° C., purification of the desired product being performed at a temperature below 130° C., preferably below 35° C.

The experimental conditions, not specifically mentioned, are the standard ones and are well known by a person skilled in the art.

The process has the advantage of not exposing the inventive compounds to strong thermal treatments which could lead to a partial degradation of the compounds.

Examples of purification include chromatography or distillation under reduced pressure.

EXAMPLES

The invention will now be described in further detail by way of the following examples, wherein the abbreviations have the usual meaning in the art, the temperatures are indicated in degrees centigrade (° C.); the NMR spectral data were recorded in CDCl$_3$ (if not stated otherwise) with a 400 MHz machine for $^1$H and $^{13}$C, the chemical displacements δ are indicated in ppm with respect to TMS as standard, the coupling constants J are expressed in Hz. The $^{31}$P-spectra were acquired at 162 MHz and measured against 85% H$_3$PO$_4$.

Example 1

Synthesis of Compounds of Formula (I)

A) Preparation of 2,2,2-trimethoxy-4,5-dimethyl-1,3,2-dioxaphosphole

In a dried flask, 2,3-butanedione (17.20 g, 0.20 mol) was added very slowly at 0-5° C. to trimethyl phosphite (27.28 g, 0.22 mol). The reaction mixture was stirred at room temperature overnight and then distilled (40-47° C./0.1 Torr) using a Vigreux-column. Pure 2,2,2-tri(methoxy)-4,5-dimethyl-1,3,2-dioxaphosphole (35.04 g) was recovered (yield: 83%).

B) Preparation of 1-acetyl-1-methyl-2-oxoalkyl dimethyl phosphate; General Procedure In a dried flask, the acid chlorid R$^1$COCl (0.16 mol) was added dropwise at room temperature to the compound obtained under A) (0.16 mol). The reaction mixture was stirred at 80° C. overnight (19 h) and became dark-brown. Volatile by-products were distilled off, using a Vigreux-column, and the residue which contained the desired product was bulb-to-bulb distilled to obtain the desired compound.

1-Acetyl-1-methyl-2-oxobutyl dimethyl phosphate (R=Ethyl)
yield=24%; purity=96%
$^1$H-NMR: 1.06 (t, J=6, 3H); 1.85 (s, 3H); 2.28 (s, 3H); 2.55-2.70 (m, 2H); 3.85 (2d, J=11, 6H).
$^{13}$C-NMR: 205.1 (s); 202.2 (s); 93.0 (s); 54.6 (q); 54.6 (q); 31.0 (t); 25.6 (q); 20.4 (q); 7.4 (q).
$^{31}$P-NMR: −1.9 (s).

1-Acetyl-1-methyl-2-oxopentyl dimethyl phosphate (R=$^n$Propyl)
yield=44%; purity=90.2%
$^1$H-NMR: 0.92 (t, J=6, 3H); 1.61 (m, 2H); 1.84 (s, 3H); 2.28 (s, 3H); 2.55-2.70 (m, 2H); 3.85 (2d, J=11, 6H).
$^{13}$C-NMR: 204.3 (s); 202.2 (s); 93.1 (s); 54.7 (q); 54.6 (q); 39.4 (t); 25.6 (q); 20.3 (q); 16.6 (t); 13.4 (q).
$^{31}$P-NMR: −1.9 (s).

1-Acetyl-1-methyl-2-oxohexyl dimethyl phosphate (R=$^n$Butyl)
yield=56%; purity=90%
$^1$H-NMR: 0.90 (t, J=6, 3H); 1.30 (m, 2H); 1.55 (m, 2H); 1.84 (s, 3H); 2.28 (s, 3H); 2.55-2.75 (m, 2H); 3.85 (2d, J=11, 6H).

$^{13}$C-NMR: 204.5 (s); 202.2 (s); 93.1 (s); 54.7 (q); 54.6 (q); 37.2 (t); 25.6 (q); 25.2 (t); 22.1 (t); 20.3 (q); 13.8 (q).

$^{31}$P-NMR: −1.9 (s).

1-Acetyl-1-methyl-2-oxoheptyl dimethyl phosphate (R="pentyl)

yield=33%; purity=85%

$^{1}$H-NMR: 0.89 (t, J=6, 3H); 1.20-1.35 (m, 4H); 1.56 (m, 2H); 1.84 (s, 3H); 2.27 (s, 3H); 2.55-2.75 (m, 2H); 3.85 (2d, J=11, 6H).

$^{13}$C-NMR: 204.5 (s); 202.2 (s); 93.1 (s); 54.7 (q); 54.6 (q); 37.5 (t); 31.1 (t); 25.6 (q); 22.8 (t); 22.4 (t); 20.3 (q); 13.9 (q).

$^{31}$P-NMR: −1.9 (s).

1-Acetyl-1-methyl-2-oxooctyl dimethyl phosphate (R="hexyl)

yield=21%; purity=85%

$^{1}$H-NMR: 0.89 (t, J=6, 3H); 1.25-1.35 (m, 6H); 1.56 (m, 2H); 1.84 (s, 3H); 2.27 (s, 3H); 2.55-2.75 (m, 2H); 3.85 (2d, J=11, 6H).

$^{13}$C-NMR: 204.5 (s); 202.2 (s); 93.1 (s); 54.7 (q); 54.6 (q); 37.6 (t); 31.6 (t); 28.6 (t); 25.6 (q); 23.1 (t); 22.5 (t); 20.3 (q); 14.0 (q).

$^{31}$P-NMR: −1.9 (s).

1-Acetyl-1-methyl-2-oxononyl dimethyl phosphate (R="heptyl)

yield=52%; purity=97%

$^{1}$H-NMR: 0.89 (t, J=6, 3H); 1.25-1.35 (m, 8H); 1.56 (m, 2H); 1.84 (s, 3H); 2.27 (s, 3H); 2.55-2.75 (m, 2H); 3.85 (2d, J=11, 6H).

$^{13}$C-NMR: 204.5 (s); 202.2 (s); 93.1 (s); 54.7 (q); 54.6 (q); 37.6 (t); 31.6 (t); 29.1 (t); 28.9 (t); 25.6 (q); 23.1 (t); 22.6 (t); 20.3 (q); 14.1 (q).

$^{31}$P-NMR: −1.9 (s).

C) Preparation of the Inventive Compounds

In a flask, the compound obtained under B) (20 mmol), H$_2$O (6.25 ml) and toluene (30 ml) were refluxed for 2 h. After the reaction mixture was cooled to room temperature, the water phase was separated, saturated with NaCl and extracted with toluene (3 times). The combined organic extracts were dried over MgSO$_4$. The solvent was removed using a Rotavapor and the residue purified on deactivated silica gel (550 mg Silice 60 A C.C. 35-70 μm, (SDS, France)+200 ml water) using pentane:ether=9:1 as solvent. The inventive compound was recovered.

3-Hydroxy-3-methyl-2,4-hexanedione (R=Ethyl)

yield=28%; purity=99%

$^{1}$H-NMR: 1.03 (t, J=6.5, 3H); 1.53 (s, 3H); 2.25 (s, 3H); 2.51 (m, 1H); 2.73 (m, 1H); 4.76 (s, 1H).

$^{13}$C-NMR: 210.2 (s); 207.5 (s); 87.5 (s); 30.3 (t); 24.6 (q); 22.8 (q); 7.6 (q).

3-Hydroxy-3-methyl-2,4-heptanedione (R="Propyl)

yield=33%; purity=98%

$^{1}$H-NMR: 0.89 (t, J=6.5, 3H); 1.53 (s, 3H); 1.58 (m, 2H); 2.23 (s, 3H); 2.48 (m, 1H); 2.67 (m, 1H); 4.75 (s, 1H).

$^{13}$C-NMR: 209.5 (s); 207.4 (s); 87.6 (s); 38.7 (t); 24.6 (q); 22.7 (q); 16.9 (t); 13.5 (q).

3-Hydroxy-3-methyl-2,4-octanedione (R="Butyl)

yield=32%; purity=98%

$^{1}$H-NMR: 0.88 (t, J=6.5, 3H); 1.29 (m, 2H); 1.52 (m, 2H); 1.53 (s, 3H); 2.23 (s, 3H); 2.49 (m, 1H); 2.66 (m, 1H); 4.73 (s, 1H).

$^{13}$C-NMR: 209.6 (s); 207.5 (s); 87.6 (s); 36.6 (t); 25.5 (t); 24.6 (q); 22.7 (q); 22.2 (t); 13.8 (q).

3-Hydroxy-3-methyl-2,4-nonanedione (R="Pentyl)

yield=17%; purity=98%

$^{1}$H-NMR: 0.88 (t, J=6.5, 3H); 1.26 (m, 4H); 1.54 (m, 2H); 1.53 (s, 3H); 2.23 (s, 3H); 2.49 (m, 1H); 2.66 (m, 1H); 4.73 (s, 1H).

$^{13}$C-NMR: 209.6 (s); 207.4 (s); 87.6 (s); 36.8 (t); 31.2 (t); 24.6 (q); 23.1 (t); 22.7 (q); 22.4 (t); 13.9 (q).

3-Hydroxy-3-methyl-2,4-decanedione (R="Hexyl)

yield=25%; purity=99%

$^{1}$H-NMR: 0.88 (t, J=6.5, 3H); 1.26 (m, 6H); 1.54 (m, 2H); 1.53 (s, 3H); 2.23 (s, 3H); 2.49 (m, 1H); 2.66 (m, 1H); 4.73 (s, 1H).

$^{13}$C-NMR: 209.6 (s); 207.5 (s); 87.6 (s); 36.8 (t); 31.5 (t); 28.7 (t); 24.6 (q); 23.4 (t); 22.7 (q); 22.5 (t); 14.0 (q).

3-Hydroxy-3-methyl-2,4-undecanedione (R="Heptyl)

yield=19%; purity=99%

$^{1}$H-NMR: 0.88 (t, J=6.5, 3H); 1.26 (m, 8H); 1.53 (m, 2H); 1.53 (s, 3H); 2.23 (s, 3H); 2.49 (m, 1H); 2.66 (m, 1H); 4.73 (s, 1H).

$^{13}$C-NMR: 209.6 (s); 207.4 (s); 87.6 (s); 36.8 (t); 31.6 (t); 29.0 (2xt); 24.6 (q); 23.4 (t); 22.7 (q); 22.6 (t); 14.1 (q).

Example 2

Preparation of a Flavoring Composition and of a Flavored Article Comprising the Inventive Compound Two flavoring compositions having a "creamy character" were prepared by admixing the following ingredients:

| | Parts by weight | |
|---|---|---|
| Ingredients | A) | B) |
| 3-hydroxy-3-methyl-2,4-nonanedione | 5.0 | — |
| 3-methyl-2,4-nonanedione | — | 5.0 |
| propylene glycol (USP) | 87.4 | 87.4 |
| Diacetyle | 0.5 | 0.5 |
| Decalactone gamma | 1.0 | 1.0 |
| Vanilline | 5.0 | 5.0 |
| Methyl hexyl ketone | 0.1 | 0.1 |
| 2-(4-Methyl-1,3-thiazol-5-yl)-1-ethanol | 1.0 | 1.0 |
| | 100.0 | 100.0 |

The addition of 0.1 part by weight of composition A) or B) to "low fat" yogurt provided two new yogurts, respectively A') and B').

The flavor of yogurt A') was best described by a pleasant sweet creamy taste with a mouthfeel sensation similar to the sensation of real milk or cream fats.

The flavor of yogurt B') was best described by a milky, buttery taste without the mouthfeel sensation of milk or cream fats.

Therefore, the inventive compound not only is able to impart an appreciated creamy note, but also generates, contrary to the prior art compounds or teaching, a mouthfeel sensation that mimics the one of cream, milk and fats.

Example 3

Preparation of a Flavoring Composition and of a Flavored Article Comprising the Inventive Compound A flavoring composition having a "tea character" was prepared by admixing the following ingredients:

| Ingredients | Parts by weight | |
|---|---|---|
| | A) | B) |
| 3-hydroxy-3-methyl-2,4-nonanedione | 0.5 | — |
| 3-methyl-2,4-nonanedione | — | 0.5 |
| propylene glycol (USP) | 85.0 | 85.0 |
| Trimethyl cyclohexenone | 1.5 | 1.5 |
| B Ionone | 1.0 | 1.0 |
| Cis Jasmone | 5.0 | 5.0 |
| Theaspirane | 2.0 | 2.0 |
| Hexanal | 5.0 | 5.0 |
| | 100.0 | 100.0 |

The addition of 0.14 part by weight of composition A) or B) to teas provided two new teas, respectively A') and B').

The flavor of tea A') in addition to the tea flavors presented also a sweet, creamy taste with a mouthfeel effect evocating the sensation of milk cream.

The flavor of tea B') in addition to the tea flavors presented also a creamy taste, but not having the mouthfeel sensation given by the inventive compound.

Therefore, the inventive compound not only is able to impart an appreciated creamy note, but also generates, contrary to the prior art compounds or teaching, a mouthfeel sensation that mimics the one of cream, milk and fats.

Example 4

Preparation of a Flavoring Composition and of a Flavored Article Comprising the Inventive Compound Two flavoring composition having a "meat character" were prepared by admixing the following ingredients:

| Ingredients | Parts by weight | |
|---|---|---|
| | A) | B) |
| 3-hydroxy-3-methyl-2,4-nonanedione | 1.00 | — |
| isovalerianic aldehyde | 0.06 | 0.06 |
| furfuryl mercaptan | 0.30 | 0.30 |
| 2,4 decadienal | 0.05 | 0.05 |
| furaneol | 0.15 | 0.15 |
| trimethyl pyrazine | 0.01 | 0.01 |
| 3-mercapto-butan 2 one | 0.02 | 0.02 |
| 3-mercapto-2-methyl pentanal | 0.03 | 0.03 |
| methylfuryl disulfide | 0.30 | 0.30 |
| methional 1% triacetine | 0.03 | 0.03 |
| methyl 5 thiazol ethanol | 0.20 | 0.20 |
| tetrahydro 2-methyl-furane-3-thiol | 0.25 | 0.25 |
| propylene glycol | 97.60 | 98.60 |
| | 100.0 | 100.0 |

Then two soups A') and B') from a dry reduced fat and salt soup base, were prepared by admixing the following ingredients:

| Ingredients | A') | B') |
|---|---|---|
| Standard reduced fat and salt powder soup base | 7.50 g | 7.50 g |

| Ingredients | A') | B') |
|---|---|---|
| Flavor A | 50 ppm | |
| Flavor B | | 50 ppm |
| Warm water | 92.50 g | 92.50 g |
| | 100.00 g | 100.00 g |

Tasting of soup A' and B' clearly demonstrated that A'had an increased mouthfeel, and the meat fat character was much more perceivable and pleasant. Furthermore, the perception of the salty note of the soups was clearer suggesting that the salt contents of A' could even be further reduced.

What is claimed is:

1. A method to confer, enhance, improve or modify the flavor properties or the mouthfeel of a flavoring composition or of a flavored article, which method comprises adding to the composition or article a compound of formula

(I)

wherein $R^1$ is a $C_{2-7}$ linear alkyl group;
in a flavor effective amount.

2. A method according to claim 1, which confers, enhances, improves or modifies mouthfeel of a flavoring composition or of a flavored article.

3. A method according to claim 1, which confers, enhances, improves or modifies green-tea notes of a flavoring composition or of a flavored article.

4. A method according to claim 1, which confers, enhances, improves or modifies creamy and fatty notes of a flavoring composition or of a flavored article.

5. A method according to claim 1, which modifies salt perception of a favoring composition or a flavored article.

6. A method according to claim 1, wherein the compound (I) is 3-hydroxy-3-methyl -2,4-nonanedione.

7. A method according to claim 1, wherein the compound is added in an amount of 0.0001% to 5% by weight of the composition or article.

8. A method according to claim 1, wherein the compound is added in an amount of 0.001% to 0.3% by weight of the composition or article.

9. A method according to claim 1, wherein the compound (I) is 3-hydroxy-3-methyl-2,4-nonanedione and is present in an amount effective to modify or improve the salt perception of the flavoring composition or flavored article.

10. A method according to claim 7, wherein the 3-hydroxy-3-methyl-2,4-nonanedione is added in an amount of 0.001% to 0.3% by weight of the composition or article.

11. A method of modifying the flavor of a flavoring composition or flavored article, which comprises adding thereto a salty perception modifying amount of 3-hydroxy-3-methyl-2,4-nonanedione in order to modify the salty perception of the composition or article.

12. A method according to claim 9, wherein the 3-hydroxy-3-methyl-2,4-nonanedione is added in an amount of 0.001% to 0.3% by weight of the composition or article.

* * * * *

UNITED STATES PATENT AND TRADEMARK OFFICE
CERTIFICATE OF CORRECTION

PATENT NO. : 7,794,767 B2  
APPLICATION NO. : 11/778402  
DATED : September 14, 2010  
INVENTOR(S) : Naef et al.

Page 1 of 1

It is certified that error appears in the above-identified patent and that said Letters Patent is hereby corrected as shown below:

Title Page:
Item (56) References Cited, Foreign Patent Documents, change "JP 2003 508753" to -- JP 2003 052331 --.

Column 10:
Line 41 (claim 5, line 2), change "favoring" to -- flavoring --.

Signed and Sealed this
Fifteenth Day of February, 2011

David J. Kappos
*Director of the United States Patent and Trademark Office*